US012379214B2

(12) United States Patent
Pottier et al.

(10) Patent No.: US 12,379,214 B2
(45) Date of Patent: Aug. 5, 2025

(54) METHOD OF AUGMENTING HUMAN PERCEPTION OF THE SURROUNDINGS

(71) Applicant: Arm Limited, Cambridge (GB)

(72) Inventors: Remy Pottier, Grenoble (FR); Simon Roger Holland, Halam (GB); Eric Van Hensbergen, Austin, TX (US); Christopher Daniel Emmons, Austin, TX (US)

(73) Assignee: Arm Limited, Cambridge (GB)

( * ) Notice: Subject to any disclaimer, the term of this patent is extended or adjusted under 35 U.S.C. 154(b) by 515 days.

(21) Appl. No.: 17/705,796

(22) Filed: Mar. 28, 2022

(65) Prior Publication Data
US 2023/0304800 A1   Sep. 28, 2023

(51) Int. Cl.
*G01C 21/00* (2006.01)
*B60W 60/00* (2020.01)
(Continued)

(52) U.S. Cl.
CPC ......... *G01C 21/16* (2013.01); *B60W 60/0017* (2020.02); *G01C 21/3848* (2020.08);
(Continued)

(58) Field of Classification Search
CPC ............... G01C 21/16; G01C 21/3848; G01C 21/3885; B60W 60/0017; G06N 20/20;
(Continued)

(56) References Cited

U.S. PATENT DOCUMENTS 10,372,130 B1 *   8/2019   Kaushansky .......... B60K 35/26
10,386,856 B2 *   8/2019   Wood .................... G01S 13/931
(Continued)

FOREIGN PATENT DOCUMENTS

KR    20140124685 A  * 10/2014  ......... G08B 21/0269

OTHER PUBLICATIONS

Shah et al, "Crowdsafe: crowd sourcing of crime incidents and safe routing on mobile devices," 19th ACM SIGSPATIAL International Symposium on Advances in Geographic Information Systems, ACM-GIS 2011, Nov. 1-4, 2011, Chicago, IL, USA, Proceedings, DOI:10.1145/2093973.2094064 (Year: 2011).*
(Continued)

*Primary Examiner* — Daniel M. Robert
(74) *Attorney, Agent, or Firm* — NIXON & VANDERHYE P.C.

(57)   ABSTRACT

The present disclosure relates to a method of augmenting human perception of the surroundings, comprising: receiving a first set of data from a user device associated with the user, the first set of data comprising at least location information; receiving a second set of data from a local distributed database associated with the location information, the second set of data comprising a position of one or more entities; constructing a digital model representing the user and the one or more entities using the first and second set of data; projecting a respective course for the user and for the or each entity by inputting the digital model into a first machine learning algorithm (MLA) to infer one or more events; identifying at least one inferred event relevant to the user by inputting the one or more inferred events to the first MLA; and communicating the at least one relevant inferred event to the user.

8 Claims, 7 Drawing Sheets

(51) Int. Cl.
*G01C 21/16* (2006.01)
*G06N 20/20* (2019.01)
*G06V 20/52* (2022.01)

(52) U.S. Cl.
CPC ......... *G01C 21/3885* (2020.08); *G06N 20/20* (2019.01); *G06V 20/52* (2022.01)

(58) Field of Classification Search
CPC ........ G06V 20/52; G06V 10/82; G06V 20/44; G06V 20/54; G06V 40/103; G06F 18/2433; G08G 1/164; G08G 1/166
See application file for complete search history.

(56) References Cited

U.S. PATENT DOCUMENTS

| | | | | |
|---|---|---|---|---|
| 10,834,128 | B1* | 11/2020 | Rajagopalan | H04L 51/212 |
| 11,074,811 | B2* | 7/2021 | Fowe | G06V 20/17 |
| 11,763,676 | B2* | 9/2023 | Andon | G08G 1/162 |
| | | | | 701/301 |
| 2005/0073438 | A1* | 4/2005 | Rodgers | G08G 1/161 |
| | | | | 340/944 |
| 2008/0248815 | A1* | 10/2008 | Busch | H04L 67/52 |
| | | | | 455/456.5 |
| 2011/0131311 | A1* | 6/2011 | van Steenbergen | H04L 67/04 |
| | | | | 709/223 |
| 2011/0210866 | A1* | 9/2011 | David | G08G 1/166 |
| | | | | 340/901 |
| 2014/0267398 | A1* | 9/2014 | Beckwith | G06T 19/006 |
| | | | | 345/633 |
| 2015/0109149 | A1* | 4/2015 | Duncan | G02B 27/01 |
| | | | | 340/944 |
| 2017/0019488 | A1* | 1/2017 | Memon | H04L 51/222 |
| 2017/0345292 | A1* | 11/2017 | Haran | G08G 1/166 |
| 2018/0126901 | A1* | 5/2018 | Levkova | B60W 40/09 |
| 2018/0321209 | A1* | 11/2018 | Gutierrez Martinez | |
| | | | | G01N 33/18 |
| 2019/0196481 | A1* | 6/2019 | Tay | G01S 17/86 |
| 2019/0212167 | A1* | 7/2019 | Yamada | G01C 21/3602 |
| 2021/0150389 | A1* | 5/2021 | Kyakuno | G06N 5/04 |
| 2021/0219101 | A1* | 7/2021 | Gandrud | G07C 9/28 |
| 2022/0037034 | A1* | 2/2022 | Stanescu | G16H 50/70 |
| 2022/0309073 | A1* | 9/2022 | Kate | G06N 5/04 |
| 2022/0327932 | A1* | 10/2022 | Nakaya | G08G 1/0133 |
| 2023/0040513 | A1* | 2/2023 | Ryan | G06V 20/52 |
| 2023/0304800 | A1* | 9/2023 | Pottier | G06V 10/82 |
| 2023/0316923 | A1* | 10/2023 | Oshima | G08G 1/166 |
| | | | | 701/301 |
| 2024/0331395 | A1* | 10/2024 | Petrey, Jr. | G08B 31/00 |

OTHER PUBLICATIONS

Shah, et al., Crowdsafe: Crowd Sourcing of Crime Incidents and Safe Routing on Mobile Devices (Demo Paper), GIS '11 [Nov. 2011]: Proceedings of the 19th ACM SIGSPATIAL International Conference on Advances in Geographic Information Systems, pp. 521-524, https://doi.org/10.1145/2093973.2094064 (Year: 2011).*

* cited by examiner

METHOD OF AUGMENTING HUMAN PERCEPTION OF THE SURROUNDINGS

FIELD OF THE INVENTION

The present disclosure relates to computer-implemented methods of augmenting human perception of the surroundings, in particular to identify and/or predict near-future potential risks or potential opportunities.

BACKGROUND

There exist technologies for augmenting human senses to improve safety or to enhance an experience. For example, a vehicle may be equipped with one or more cameras to display to a driver a rear view of the vehicle and/or provide visual or audio indication when the vehicle is approaching an obstacle to provide assistance to the driver when the vehicle is reversing. Another example includes an app that warns the user of a smartphone if sensor data indicates that the user is using the smartphone while walking. There are also technologies able to respond autonomously to an identified risk, for example, emergency braking systems are provided to some vehicles to stop the motion of a vehicle when the vehicle is on course for a collision.

However, existing technologies are limited to specific objectives and focus on a narrow set of data directly related to a user for identifying only a specific risk. Thus, existing technologies cannot provide a comprehensive overview of the surroundings to the user and cannot take into account actions of entities around the user give rise to risks or opportunities for the user.

It is therefore desirable to provide improved methods of augmenting human perception of the surroundings to enable potential risks and/or potential opportunities to be assessed and identified.

BRIEF DESCRIPTION OF THE DRAWINGS

Embodiments will now be described, with reference to the accompanying drawings, in which.

DETAILED DESCRIPTION

Figure 1:
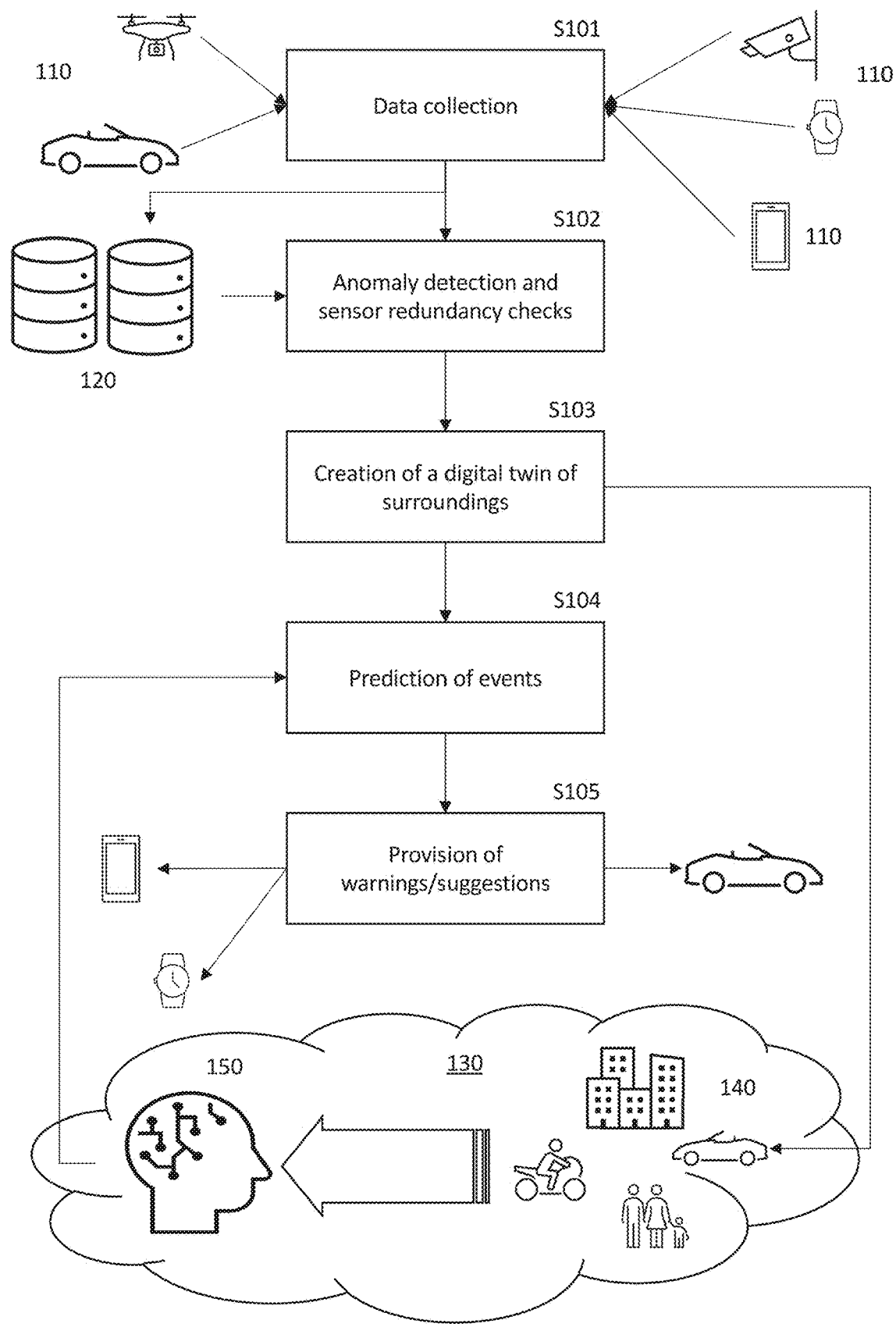
FIG. 1 shows a high-level flow diagram of methods of augmenting human perception of the surroundings according to the present technology.

An aspect of the present technology provides a computer-implemented method of augmenting human perception of the surroundings to identify a risk and/or an opportunity, comprising: receiving a first set of data with respect to a user from a user device associated with the user, the first set of data comprising at least location information; receiving a second set of data from a local distributed database associated with the location information, the second set of data comprising a position of one or more entities associated with the location information; constructing a digital model representing the user and the one or more entities using the first and second set of data; projecting a respective course for the user and for the or each entity by inputting the digital model into a first machine learning algorithm (MLA) to infer one or more events involving the user in relation to the one or more entities; identifying at least one relevant inferred event from the one or more inferred events by inputting the one or more inferred events to the first MLA to identify a risk or an opportunity relevant to the user; and communicating the at least one relevant inferred event to the user.

According to embodiments of the present technology, data related to a user and data related to entities in the surroundings of the user are collected, and the collected data is used for constructing a digital model of the user's surroundings in which the user and the entities are represented by their respective "digital twins". Herein, an entity may include living beings such as a person, an animal, or a plant, and inanimate objects such as a vehicle, a building, a structure, etc. Depending on the data collected on the user and the entities, a "digital twin" may simply represent a position of the user or an entity, or it may replicate other aspects of the user or the entity, such as motion, behavioural pattern, and other attributes such as size, age, etc. The digital model comprising the respective digital twins of the user and the entities is then used as input to a machine learning algorithm (MLA) to project respective courses of the user and the entities, for example the user is approaching the exit of a building, person A is moving in a particular direction at a certain speed, there is a high chance of rain, etc. and the MLA uses the projected courses to infer one or more events involving the user in relation to one or more of the entities, for example, the user may encounter person A, the user may encounter rain, etc. The MLA then identifies whether any of the inferred events are relevant to the user, for example, whether any of the inferred events represent a risk or an opportunity for the user, and communicates the identified event or events to the user. The MLA may use data previously gathered on the user or other users to identify whether an inferred event is relevant, for example, the MLA may learn the preference of the user e.g. whether to meet certain people or take particular routes, or the MLA may use health and medical data of the user to decide whether an inferred event may impact the user's health. For example, the MLA may identify the inferred event of the user encountering person A as irrelevant to the user based e.g. on an electronic contact list of the user indicating person A as a stranger, but identify the inferred event of the user encountering rain as relevant based on the user's planned route, and communicate the latter inferred event to the user, for example through a personal electronic device such as a smartphone, a smartwatch, etc.

Through constructing a digital model representing the user's surroundings populated with the respective digital twins of the user and entities, embodiments of the present technology are able to infer near-future events by simulating the respective courses of the user and the entities using their digital twins and identify events that are relevant to the user, such that the user may avoid potential risks and/or exploit potential opportunities. Compared to technologies that focus on one specific aspect of a user's surrounding to identify a specific risk, embodiments of the present technology are able to take into account of data from multiple sources related to multiple entities and as such are able to infer near-future events in relation to multiple entities that may be relevant to the user.

Another aspect of the present technology provides a computer-implemented method of training a machine learning algorithm (MLA) for augmentation of human perception of the surroundings to identify a risk and/or an opportunity, comprising: collecting a first set of data with respect to a user from a user device associated with the user, the first set of data comprising at least location information; collecting a second set of data from a local distributed database associated with the location information, the second set of data comprising a position of one or more entities associated with the location information; constructing a digital model representing the user and the one or more entities using the first and second set of data; collecting a third set of data from the user, the user device, and/or the local distributed database, the third set of data comprising one or more events associated with the location information occurred over a predetermined time period from when the first and second set of data were collected; generating a first training set comprising the digital model and the third set of data; training the MLA using the first training set to project a course for the user and the one or more entities to infer one or more events involving the user in relation to the one or more entities using the digital model as input and the third set of data as output; generating a second training set by selecting at least one event from the third set of data that is relevant to the user for identifying a risk or an opportunity; and training the MLA using the second training set to identify at least one relevant event from the one or more inferred events.

A further aspect of the present technology provides a computer-implemented method comprising:
training a machine learning algorithm (MLA) by:
generating a first training set by collecting data from a first plurality of user devices comprising location information respectively associated with the first plurality of user devices, and data from a first plurality of distributed databases associated with the location information of the first plurality of user devices comprising information related to a first plurality of entities and a first plurality of events involving the first plurality of user devices and/or the first plurality of entities;
training the MLA using the first training set to infer one or more events specific to location information of a given user device;
generating a second training set by selecting, for each of the first plurality of user devices, at least one event from the first plurality of events that is relevant to a user associated with the user device based on behaviour data of the user;
training the MLA using the second training set to identify at least one relevant event from the one or more inferred events; and
deploying the trained MLA at a second user device by:
receiving a first set of data with respect to a second user from the second user device, the first set of data comprising at least location information of the second user device; and
receiving a second set of data from a local distributed database associated with the location information of the second user device, the second set of data comprising information related to a second plurality of entities associated with the location information of the second user device;
inferring one or more future events involving the second user in relation to the second plurality of entities by inputting into the MLA the first set of data and the second set of data;
identifying at least one relevant future event from the inferred one or more future events by inputting the one or more inferred future events into the MLA; and
communicating the at least one relevant future event to the second user.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

The following gives a brief overview of a number of different types of machine learning algorithms for embodiment(s) in which one or more MLAs are used. However, it should be noted that the use of an MLA in these embodiment(s) is a non-limiting example of implementing the present technology, and the use of an MLA should not be regarded as essential.

Overview of MLAs

There are many different types of MLAs known in the art. Broadly speaking, there are three types of MLAs: supervised learning-based MLAs, unsupervised learning-based MLAs, and reinforcement learning-based MLAs.

Supervised learning MLA process is based on a target—outcome variable (or dependent variable), which is to be predicted from a given set of predictors (independent variables). Using this set of variables, the MLA generates a function using training data that maps inputs to desired outputs during training. The training process continues until the MLA achieves a desired level of accuracy on validation data. Examples of supervised learning-based MLAs include: Regression, Decision Tree, Random Forest, Logistic Regression, etc.

Unsupervised learning MLA does not involve predicting a target or outcome variable but learns patterns from untagged data. Such MLAs are capable of self-organization to capture patterns as probability densities, and are used e.g. for clustering a population of values into different groups. Clustering is used in many fields including pattern recognition, image analysis, bioinformatics, data compression, computer graphics, etc. Examples of unsupervised learning MLAs include: apriori algorithm and k-means algorithm.

Reinforcement learning MLA is trained to take actions or make decisions that maximize cumulative reward (e.g. a user-provided score). During training, the MLA is exposed to a training environment where it learns through trial and error to develop an optimal or near-optimal policy that maximizes reward. In doing so, the MLA learns from past experience and attempts to capture the best possible knowledge to make desirable decisions. An example of reinforcement learning MLA is a Markov Decision Process.

It should be understood that different types of MLAs having different structures or topologies may be used for various tasks. One particular type of MLAs includes artificial neural networks (ANN), also known as neural networks (NN).

Neural Networks (NN)

Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus, rather than attempting to determine a complex statistical arrangements or mathematical algorithms for a given situation, the given NN aims to provide an "intuitive" answer based on a "feeling" for a situation. The given NN is thus regarded as a trained "black box", which can be used to determine a reasonable answer to a given set of inputs in a situation giving little importance to what happens inside the "box".

NNs are commonly used in many such situations where an appropriate output based on a given input is important, but exactly how that output is derived is of lesser importance or is unimportant. For example, NNs are commonly used to optimize the distribution of web-traffic between servers and in data processing, including filtering, clustering, signal separation, compression, vector generation and the like.

Deep Neural Networks

In some non-limiting embodiments of the present technology, the NN can be implemented as a deep neural network. It should be understood that NNs can be classified into various classes of NNs. Below are a few non-limiting example classes of NNs.

Recurrent Neural Networks (RNNs)

RNNs are adapted to use their "internal states" (stored memory) to process sequences of inputs. This makes RNNs well-suited for tasks such as unsegmented handwriting recognition and speech recognition, for example. These internal states of the RNNs can be controlled and are referred to as "gated" states or "gated" memories.

It should also be noted that RNNs themselves can also be classified into various sub-classes of RNNs. For example, RNNs comprise Long Short-Term Memory (LSTM) networks, Gated Recurrent Units (GRUs), Bidirectional RNNs (BRNNs), and the like.

LSTM networks are deep learning systems that can learn tasks that require, in a sense, "memories" of events that happened during very short and discrete time steps earlier. Topologies of LSTM networks can vary based on specific tasks that they "learn" to perform. For example, LSTM networks may learn to perform tasks where relatively long delays occur between events or where events occur together at low and at high frequencies. RNNs having particular gated mechanisms are referred to as GRUs. Unlike LSTM networks, GRUs lack "output gates" and, therefore, have fewer parameters than LSTM networks. BRNNs may have "hidden layers" of neurons that are connected in opposite directions which may allow using information from past as well as future states.

Residual Neural Network (ResNet)

Another example of the NN that can be used to implement non-limiting embodiments of the present technology is a residual neural network (ResNet).

Deep networks naturally integrate low/mid/high-level features and classifiers in an end-to-end multilayer fashion, and the "levels" of features can be enriched by the number of stacked layers (depth).

Convolutional Neural Network (CNN)

CNNs are also known as shift invariant or space invariant artificial neural networks (SIANN), based on the shared-weight architecture of the convolution kernels or filters that slide along input features and provide translation equivariant responses known as feature maps. They are most commonly applied to analyze visual imagery and have applications in image and video recognition, recommender systems, image classification, image segmentation, medical image analysis, natural language processing, brain-computer interfaces, and financial time series.

CNNs are regularized fully connected networks, that is, each neuron in one layer is connected to all neurons in the next layer. CNNs use relatively little pre-processing compared to other image classification algorithms and learn to optimize the filters (or kernels) through automated learning.

To summarize, the implementation of at least a portion of the one or more MLAs in the context of the present technology can be broadly categorized into two phases—a training phase and an in-use or deployed phase. First, the given MLA is trained in the training phase using one or more appropriate training data sets. Then, once the given MLA learned what data to expect as inputs and what data to provide as outputs, the given MLA is executed using in-use data in the in-use or deployed phase. Further, while deployed, the given MLA may continue to learn from the in-use data based for example on user feedback.

FIG. 1 shows a high-level flow diagram of a method of augmenting human perception of the surroundings according to the present technology.

The method begins at S101, when data is collected at a plurality of sources by a plurality of data-collecting devices 110 such as vehicles including autonomous vehicles, drones including radio-controlled and autonomous drones, video-surveillance devices including street cameras, CCTV, speed cameras and doorstep cameras, smart devices including wearable devices, smartphones and tablets, tracking devices including proximity trackers and GPS trackers (e.g. asset trackers for probation services, child tracker). As desired, a secure enclave may be defined in the memory of each data-collecting device for storing the collected data such that the data is protected from tampering. Moreover, a secured communication channel may be established between one or more sensors and a data-collecting device, and data to and from a sensor may be signed at sensor level. Similarly, communication between a data-collecting device and a third-party database may be established via a secured communication channel. As desired, one or more devices may be augmented by artificial intelligence (e.g. an AI digital assistant) that learns the behaviour patterns of users of these devices and is able to provide additional context to the data collected on these devices, such as preferences for routes, speed, activities, etc., any vulnerabilities such as health or medical conditions or disabilities, whether the collected data agrees with the normal behaviour pattern, etc.

The data collected at various data-collecting devices 110 is collected by one or more local distributed databases 120 (e.g. Hypercat). Each device 110 may be configured to send only some, but not necessarily all, of the collected data, and the type or proportion of data to be sent to the one or more local distributed databases 120 can differ from device to device based on user preferences and security or privacy considerations. At the one or more local distributed databases 120, anomaly detection and sensor redundancy checks may be performed on the collected data at S102, for example by a trained MLA. For example, image data obtained from a street camera can be used for cross-checking the position of a vehicle against sensor data obtained from the vehicle.

Next, a digital model 140 of the surrounding area is created at S103, e.g. by a simulation software or a trained MLA, on an AR (augmented reality) cloud 130 connected to one or more of the data-collecting devices 110 either directly through a secure communication channel or indirectly through the one or more local distributed databases 120. It should be noted that the digital model of the surrounding area needs not be global; an island approach may be adopted and, in some cases, such an approach may be more desirable. The digital model 140 comprises a "digital twin" of each entity (e.g. a person, a vehicle, a building, etc.) in the real world based on data received from the plurality of data-collecting devices 110.

On the AR cloud 130, a supervising AI 150 uses information obtained from the digital model 140 to predict one or more near-future events at S104. Examples of such near-future events that may be predicted using the digital model 140 includes a collision between two vehicles, a collision between a pedestrian and an autonomous vehicle, an encounter between two persons known to each other, etc.

In further embodiments, the method may, for a given user, be augmented by an AI digital twin of the user running locally on a device or remotely on a cloud server, which learns the habits and preferences of the user and act as a virtual security and safety agent in both the physical world and the digital world to e.g. warn the user of potential accidents, aggression from others, damages to properties, and warn the user of potential issues on cybersecurity, privacy, fraud, etc.

Based on the predicted near-future events, the supervising AI 150 can at S105 provide warnings on potential risks and dangers or suggestions for opportunities such as meeting a person that may be of interest or taking a quicker alternative route. These warnings and suggestions may be communicated to a human operator through a personal or shared device, for example by means of a text, verbal or multimedia notification.

In further embodiments, a device (e.g. a wearable device, a mobile device) may be configured to display to a user of the device in an augmented reality a predicted near-future event in the form of a flash vision such as a brief simulation of the near-future event, for example on a display, a headset, or directly through a brain-computer interface (BCI) to enable fast information transfer.

In further embodiments, an AI engine may be provided for detecting anomalies in the local distributed database 120 to identify, and optionally prevent, possible attacks to the network to which the devices are connected. This AI engine may be separate from the supervising AI 150 or it may be integrated as part of the function of the supervising AI 150.

It is expected that, in the near future, devices such as vehicles, drones, wearable devices, smartphones, home appliances, sport equipment, implants, brain computer interface (BCI), etc., will be connected to the internet in an internet of things, IoT, and to an augmented reality (AR) cloud. The Applicant has recognised that, through the interconnected devices, it may become possible to infer e.g. from individual device position, movement, behaviour, etc., that certain events (e.g. accidents, aggression) have a high probability of occurring if there are no intervening actions.

According to the present technology, a specific service layer or application may be provided to identify risks or opportunities through prediction of (near-) future events, and alert the relevant person or persons to avoid or mitigate a risk or take advantage of an opportunity similar to what a human would considered as a "sixth sense". Such predicted or inferred near-future events may be transmitted to the physical world and communicated to the relevant person through e.g. a personal electronic device or an AR device.

Thus, the present technology provides techniques for predicting near-future events involving multiple independently acting entities through the construction of a digital model of the physical environment with respect to a specific device (i.e. a specific user) and populated with digital twins of physical entities in the physical environment, and communicating near-future events that are relevant to the specific user. The present technology is particularly relevant when the potential risks or opportunities arise from events involving entities (or indications) that are hidden from sight, such as a potentially aggressive person approaching from around the corner, a vehicle approaching from behind, fraudulent activities online, an unexpected deviation from the normal behavioural pattern, etc. Through the present technology, it is possible to augment the user's perception of the surroundings with a digital sixth sense that enable potential risks or opportunities to be identified before the events happen such that the user is given more time to prepare and respond.

The present technology may be implemented in different scenarios. For example, in a smart city scenario, the present technology may be used to improve the safety and security of its human occupants such as by improving pedestrian safety by predicting and communicating possible accidents, improving mobility experience by assisting with orientation. For example, in a smart building scenario, the present technology may be used to improve user experience by predicting which elevator will arrive first. For example, in a smart subway scenario, the present technology may be used to improve pedestrian safety by inferring aggression from a person approaching from around the corner. Discussed below are some non-limiting implementation examples of the present technology. It should be noted that the following examples are for illustration of the present technology only and features of the examples should not be regarded as essential or limiting. It will be clear to a skilled reader that modifications and alternatives are possible without departing from the present technology.

Figure 2A:
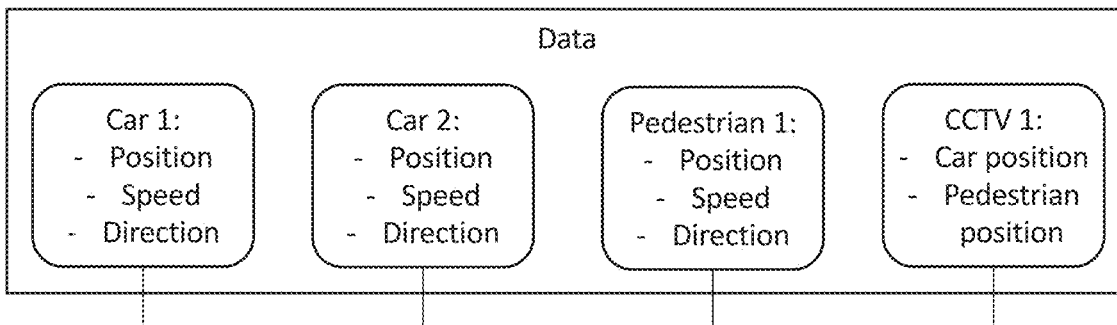
FIG. 2A shows a flow diagram of a first implementation example of a method of augmenting human perception of the surroundings according to an embodiment.
Figure 2A:
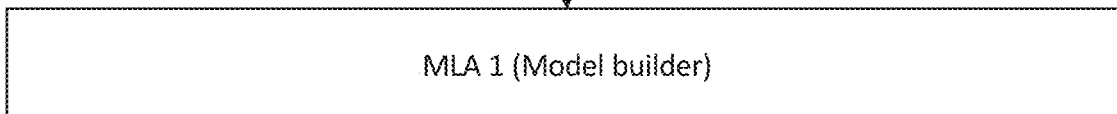
Figure 2A:
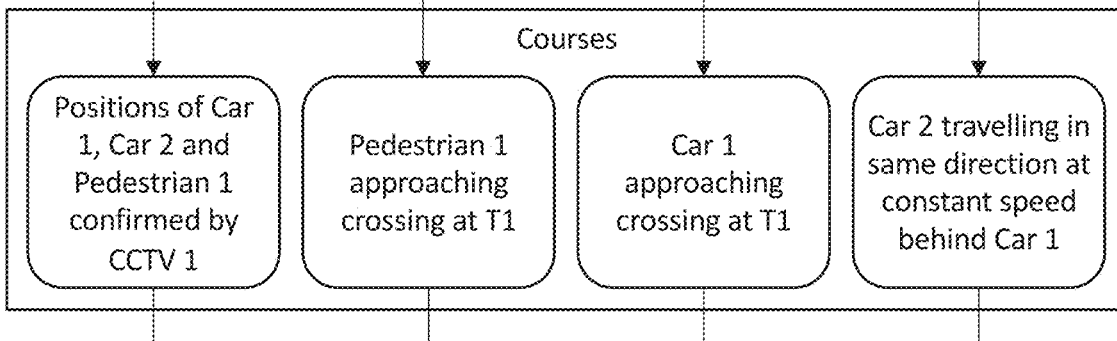
Figure 2A:
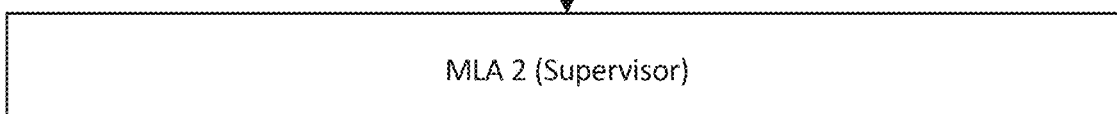
Figure 2A:
Figure 2B:
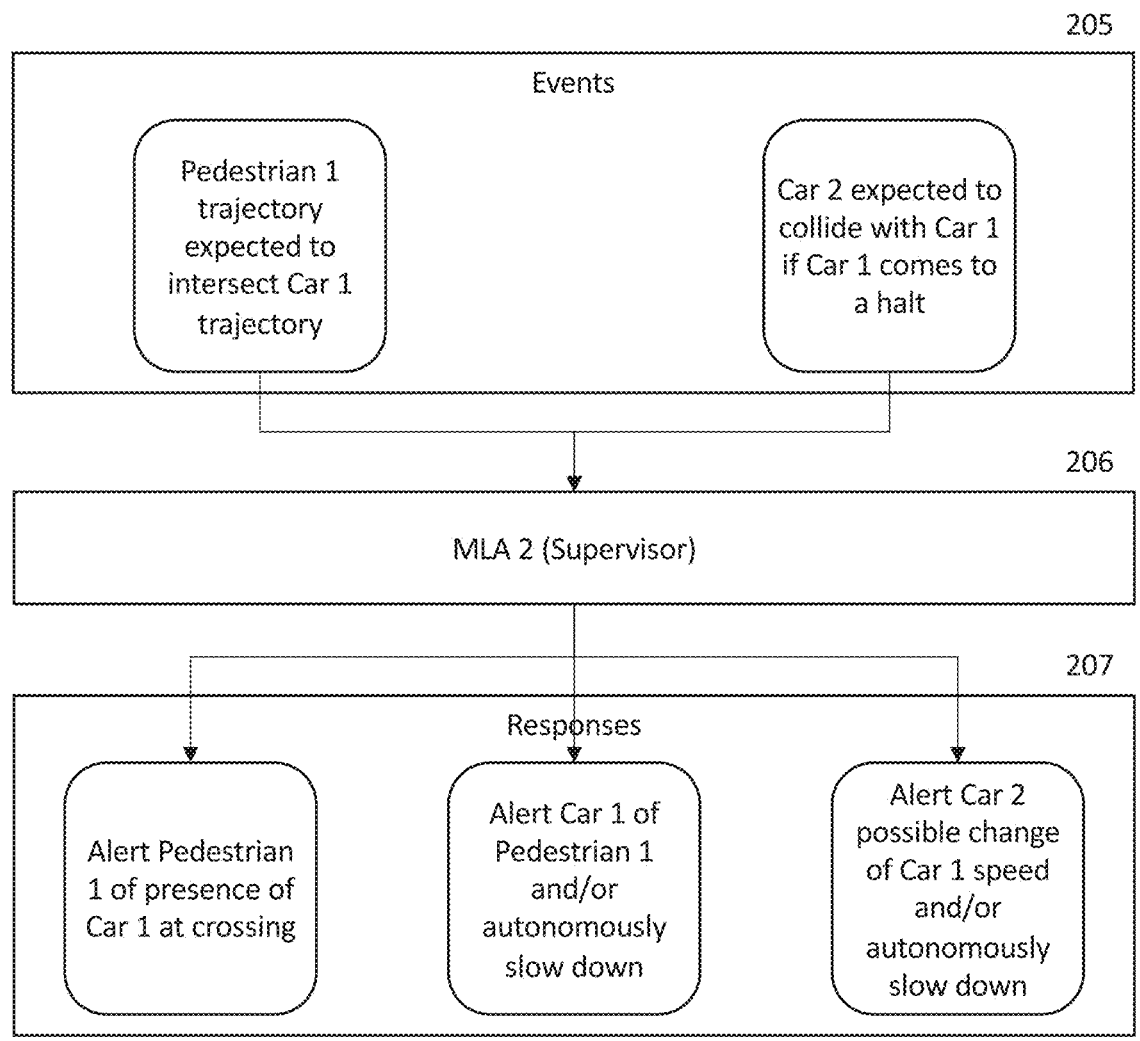
FIG. 2B shows the continuation of the first implementation example.

FIGS. 2A and 2B show a flow diagram of a first implementation example of a method of augmenting human perception of the surroundings according to an embodiment. The present example illustrates a "smart city" implementation in which an island approach is adopted such that "the surroundings" is taken to be an area of the city in isolation e.g. defined by a predetermined radius.

In the present example, the defined "surroundings" includes two vehicles, Car 1 and Car 2, a human, Pedestrian 1, and a device, CCTV 1. In practice, there may be many more vehicles, humans, and devices in the surroundings; however, for the purpose of illustrating the present technology, a small number of entities is used for simplicity.

At 201, data such as position, speed and direction of motion is collected from Car 1 and Car 2, for example via an onboard computer provided to Car 1 and Car 2. Data such as position, speed and direction of motion is also collected from Pedestrian 1, for example via a smartphone or a wearable device. Data is also collected from CCTV 1, which may include position information or identification information that allows CCTV 1 to be identified (and therefore its position to be determined), image and/or video data collected by CCTV 1 that allows the position and optionally speed and direction of an entity (e.g. a car, a pedestrian) to be determined.

The data collected from the various data-collecting devices are input to MLA 1 at 202 to construct a digital model of the surroundings including a digital twin of each of Car 1, Car 2, and Pedestrian 1. MLA 1 may check the data obtained from Car 1, Car 2 and Pedestrian 1 against the data obtained from CCTV 1 e.g. to confirm the position, speed and/or direction of motion for each entity.

Then, based on the digital model and the digital twins, MLA 1 projects a course for each of Car 1, Car 2, and Pedestrian 1 at 203. For example, MLA 1 may project that Pedestrian 1 is approaching a road crossing and will reach the crossing at time T1. In addition, MLA 1 may project that Car 1 is also approaching the crossing and will reach the crossing at T1 from a different direction. Further, MLA 1 may determine that Car 2 is travelling behind Car 1 in the same direction.

The information may be input into an MLA 2 at 204 to infer one or more near-future events that may occur based on the projected courses of the entities. It should be noted that MLA 1 and MLA 2 may represent the same MLA or different MLAs as desired.

At 205, MLA 2 infers that the trajectory of Pedestrian 1 will intersect with the trajectory of Car 1 if both Pedestrian 1 and Car 1 maintain their current speed and direction of motion. Further, MLA 2 infers that Car 2 will collide with Car 1 if Car 1 brakes suddenly following a collision with Pedestrian 1. The inferred near-future event is then communicated, by MLA 2, to each relevant user to alert the user to the identified risk.

In addition, MLA 2 may at 206 determine one or more appropriate response based on the inferred near-future events, and, at 207, either interact with the relevant user through a corresponding user device to assist the user in responding to the inferred event, or cause the corresponding user device to autonomously carry out an appropriate response. For example, MLA 2 may, e.g. through displaying text or imagery in augmented reality on Pedestrian 1's smart glasses, warn Pedestrian 1 of the approaching Car 1 and advise Pedestrian 1 to stop. In addition, MLA 2 may, e.g. through an onboard computer on Car 1, alert Car 1 (or the driver of Car 1) of the presence of Pedestrian 1 and advise Car 1 to slow down or autonomously apply the brake to reduce the speed of Car 1. Moreover, MLA 2 may, e.g. through an onboard computer on Car 1, alert Car 2 (or the driver of Car 2) of a possible change of speed of Car 1 and advise Car 2 to reduce speed or autonomously apply the brake to reduce the speed of Car 2.

Figure 3A:
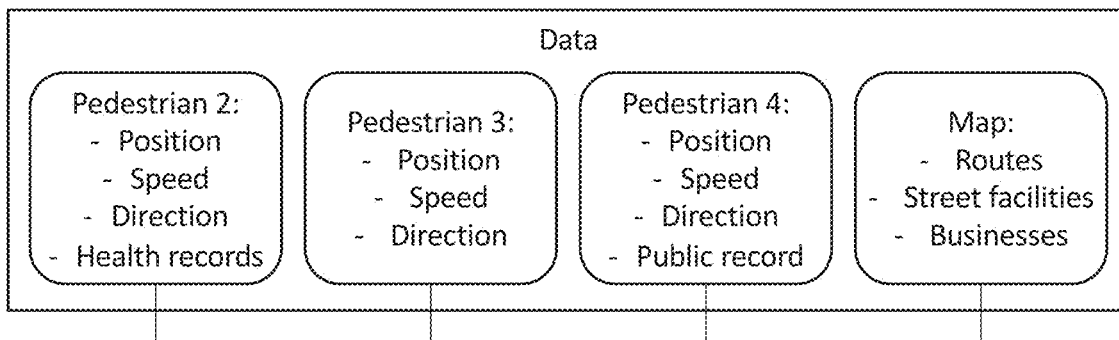
FIG. 3A shows a flow diagram of a second implementation example of a method of augmenting human perception of the surroundings according to an embodiment.
Figure 3A:
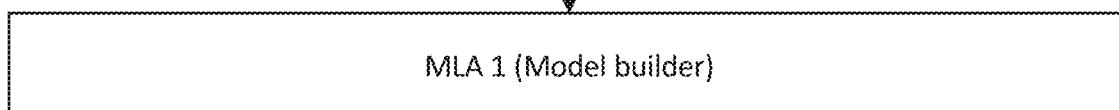
Figure 3A:
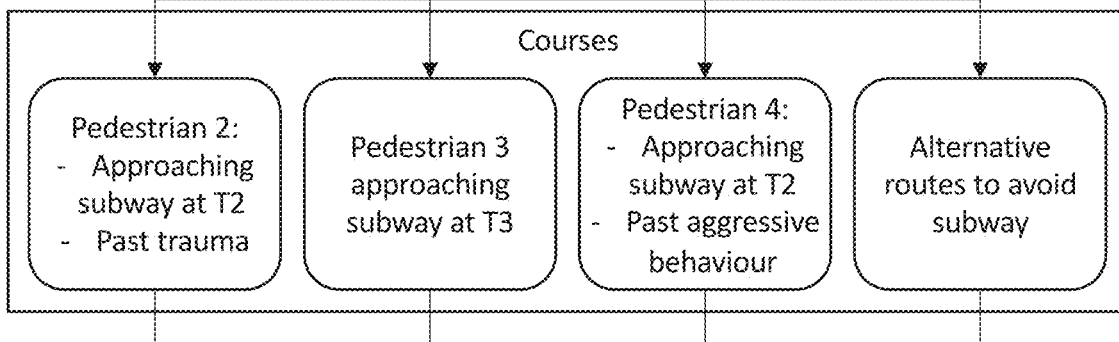
Figure 3A:
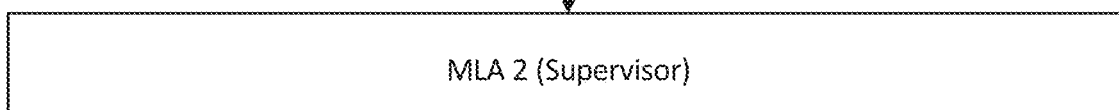
Figure 3A:
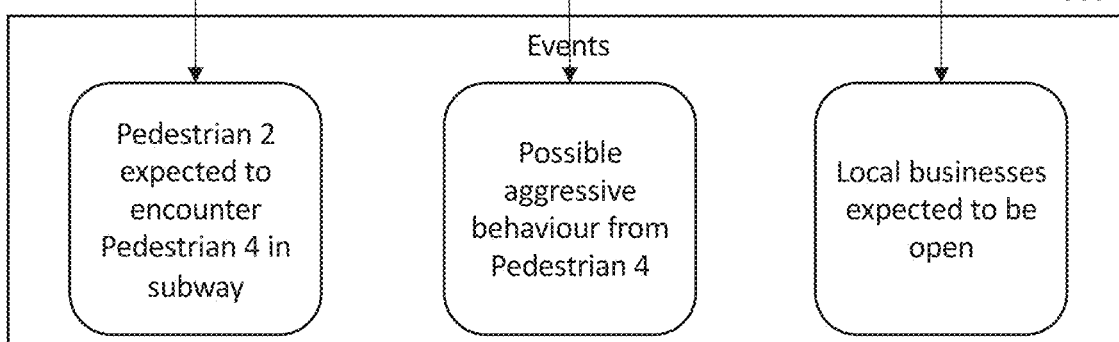
Figure 3B:
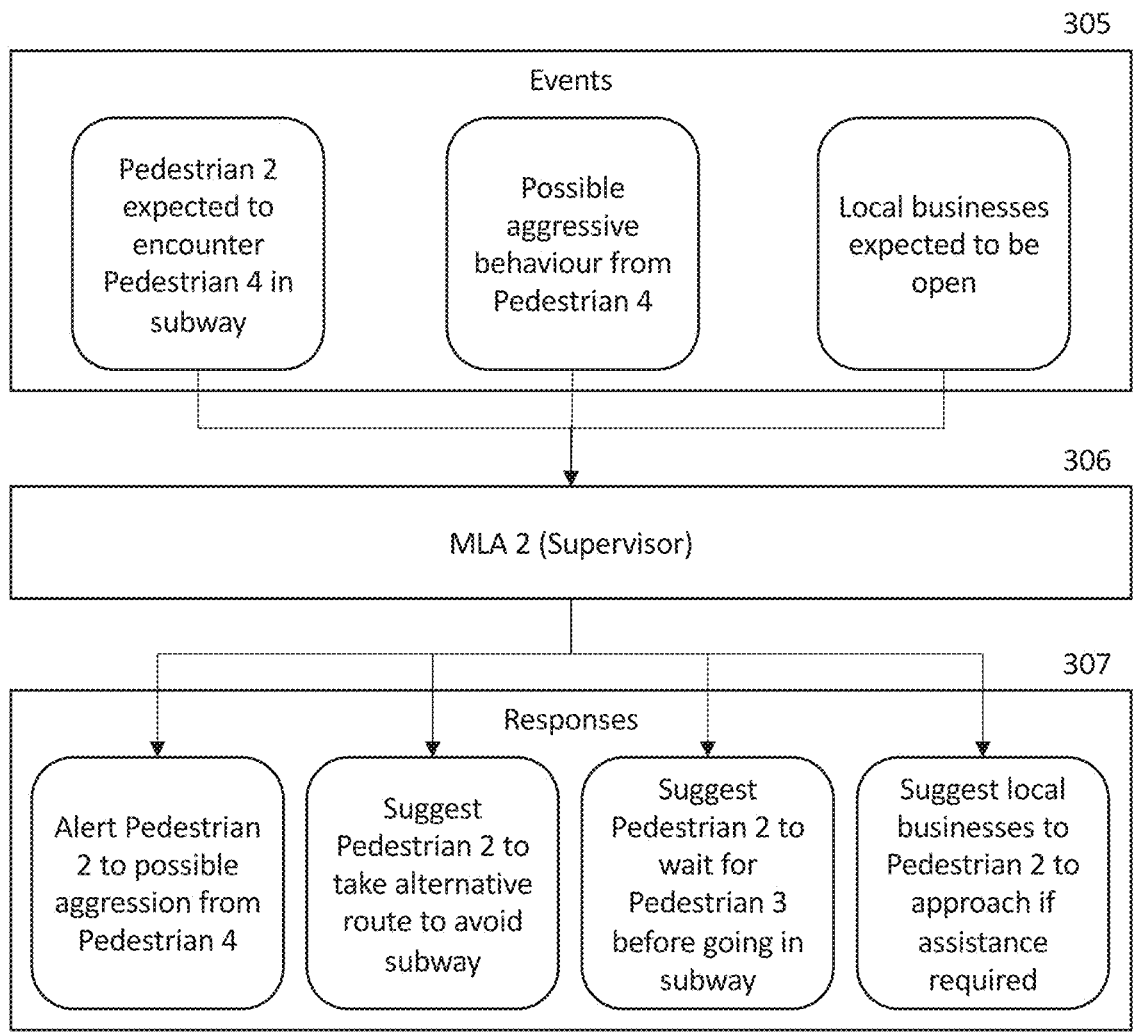
FIG. 3B shows the continuation of the second implementation example.

FIGS. 3A and 3B show a flow diagram of a second implementation example of a method of augmenting human perception of the surroundings according to an embodiment. The present example illustrates a "smart subway" implementation in which "the surroundings" is defined as an area e.g. defined by a predetermined radius centered on the subway. In the present example, the defined "surroundings" includes three humans, Pedestrian 2, Pedestrian 3 and Pedestrian 4.

At 301, data is collected from a plurality of data-collecting devices. For example, movement data associated with Pedestrian 2 may be collected from a smartphone and a wearable device such as a smart watch, and health data associated with Pedestrian 2 may be accessed via a health app installed on the smartphone which Pedestrian 2 has granted access. Similarly, movement data associated with Pedestrian 3 may be collected from a corresponding smart device. Movement data associated with Pedestrian 4 may be collected from a corresponding smart device, and further, public record associated with Pedestrian 4 may be accessed through one or more local distributed databases. In addition, data on the subway surroundings including different routes, local businesses, and street facilities (e.g. public toilets, street lights, etc.) may be obtained e.g. from one or more local distributed databases or from the internet such as from one or more electronic maps.

The data collected from the various data-collecting devices are input to MLA 1 at 302 to construct a digital model of the subway surroundings including a digital twin of each of Pedestrian 2, Pedestrian 3 and Pedestrian 4. MLA 1 may check the data obtained from Car 1, Car 2 and Pedestrian 1 against the data obtained from one or more electronic maps e.g. to confirm the position of each pedestrian.

Then, based on the digital model and the digital twins, MLA 1 projects a course for each of Pedestrian 2, Pedestrian 3 and Pedestrian 4 at 303. For example, MLA 1 may project that Pedestrian 2 is approaching the subway and will reach the subway at time T2. Moreover, MLA 1 may identify that Pedestrian 2 has experienced past trauma. In addition, MLA 1 may project that Pedestrian 3 is approaching the subway and will reach the subway at a later time T3. Further, MLA 1 may project that Pedestrian 4 is also approaching the subway in a different direction and will reach the subway at T2. MLA 1 may also identify, e.g. from public records, that Pedestrian 4 has a record of past aggressive behaviour. MLA 1 may further identify that there are one or more alternative routes to the subway in the event that the subway is not available (e.g. due to a flood).

The information may be input into an MLA 2 at 304 to infer one or more near-future events that may occur based on the projected courses of the entities. Again, it should be noted that MLA 1 and MLA 2 may represent the same MLA or different MLAs as desired.

At 305, MLA 2 infers that Pedestrian 2 will encounter Pedestrian 4 in the subway if both Pedestrian 2 and Pedestrian 4 maintain their current speed and direction of motion. Further, MLA 2 infers e.g. based on the identified public record associated with Pedestrian 4, that there is a possibility of aggressive behaviour from Pedestrian 4. MLA 2 further infers, e.g. based on data associated with local businesses and a current time, that some local businesses are expected to be open. The inferred near-future event is then communicated, by MLA 2, to one or more relevant users.

In addition, MLA 2 may at 306 determine one or more appropriate responses based on the inferred near-future events, and, at 307, either interact with the relevant user through a corresponding user device to assist the user in responding to the inferred event, or cause the corresponding user device to autonomously carry out an appropriate response. For example, MLA 2 may, in view of the past trauma experienced by Pedestrian 2, alert Pedestrian 2 of the possible encounter with Pedestrian 4 and warn Pedestrian 2 of possible aggression. In addition, MLA 2 may suggest Pedestrian 2 to take an alternative route to avoid the subway, or suggest Pedestrian 2 to wait for the arrival of Pedestrian 3 before going into the subway. Moreover, MLA 2 may further suggest local businesses that are open to Pedestrian 2 to approach if assistance is required. For example, these alternative courses of action may be displayed in augmented reality on Pedestrian 2's smart glasses In further examples, the present technology may be implemented in health applications, for example to advise a user to avoid a certain area that will become crowed (e.g.

based on movement of multiple persons) for infection control, or to advise a user to rest when certain physiological signs are detected indicating possible health issues.

In further examples, the present technology may be implemented in human interaction applications, for example using behaviour predictive models to anticipate human behaviour and/or emotions in situations where interactions are expected, e.g. to identify and avoid a person with possible malicious intention, or to approach a person with friendly intention in a social or business event.

In further examples, the present technology may be implemented in business and human resources applications, for example to augment the decision making by professional in complex time bound situations based on professional experience and knowledge of past activities of individual professionals or using third-party data.

Figure 4:
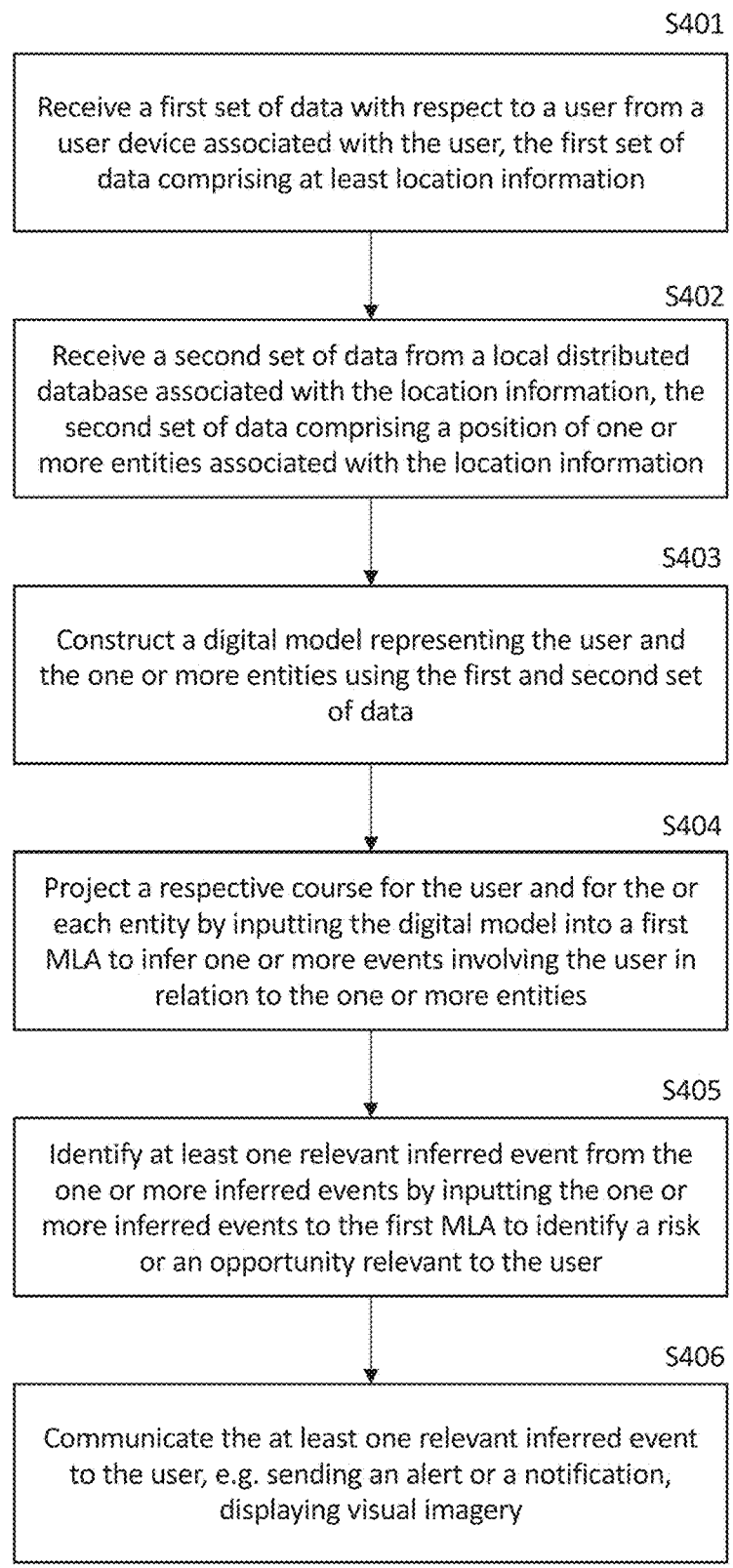
FIG. 4 shows a flow diagram of an embodiment of a method of augmenting human perception of the surroundings.

FIG. 4 shows a flow diagram of an embodiment of a method of augmenting human perception of the surroundings. The present embodiment provides a computer-implemented method of augmenting human perception of the surroundings to identify a risk and/or an opportunity. The method may be implemented as software code executable by one or more processors e.g. on a user device, on a cloud server, or a combination thereof. The method may be partially or wholly implemented as one or more machine learning algorithms (MLA) previously trained to performed various steps of the method. In the following discussion, the method is described from the perspective of a user device on/through which the method is executed. However, it should be understood that the method may be executed on multiple interconnected devices (associated with multiple users) simultaneously.

The method begins at S401 by receiving a first set of data from a user device that is associated with a user. The first set of data provides information about the user and comprises at least location information of the user (e.g. a GPS location of the user, a proximity detection in relation to buildings, vehicles, shops, etc. in the local area of the user, a check-in option on an app that allows the user to indicate their whereabout, etc.).

In some embodiments, the first set of data may further comprise one or more of a velocity, movement, behaviour or behaviour patterns, or a category or classification of the user, and the second set of data may further comprise one or more of a velocity, movement, behaviour or behaviour patterns, or a category or classification of the one or more entities.

In some embodiments, the first set of data may further comprise one or more of a planned route, one or more health records, one or more medical records, one or more contact lists, online activity history, and purchase history.

At S402, a second set of data is received from a local distributed database that is associated with the location information. The method is not limited to receiving data from a single database; if multiple distributed databases are accessible, the method may include receiving data from more than one database. The second set of data provides information from or about one or more entities (e.g. pedestrians, vehicles, buildings, infrastructure, etc.) in the local area of the user and comprises at least a position of the one or more entities associated with the location information.

In some embodiments, the one or more entities may comprise one or more humans, one or more animals, one or more vehicles including autonomous vehicles, one or more structures, one or more devices including publicly or privately owned computer, computer systems, drones and street cameras, and wherein the second set of data further comprises one or more public records, data collected on the one or more devices, data collected on the one or more vehicles, or a combination thereof.

There may be instances when the same or similar information about the same user or the same entity is represented in data from different sources. For example, the speed at which a vehicle is travelling may be represented in speedometer data from the vehicle onboard computer, image data from a speed camera, and LiDAR (light detection and ranging) data from another vehicle. In this case, instead of using the different sources of data as different input, increasing processing load, it may be desirable to first cross-check data from different sources to determine if there are redundancies in the data (and optionally to confirm the accuracy of at least some of the data), and remove such redundancies before inputting the data to the first MLA. Thus, in some embodiments, the method may further comprise detecting a redundancy in the first and second set of data by cross-checking from a plurality of sources and removing the detected redundancy.

At S403, the method proceeds to construct a digital model, e.g. on an AR cloud, to represent the user and the one or more entities as respective digital twins in a digital world using the first and second set of data. How accurately a digital twin represents the user or an entity would depend on the amount and the quality of the data collected on the user or the entity.

In some embodiments, the method may further comprise: generating from the first set of data a respective motion vector for the user and generating from the second set of data a respective motion vector for the or each entity, the motion vector representing respective motion of the user and the entity, and the digital model may further comprise the respective motion vectors of the user and the one or more entities.

At S404, the digital model comprising the digital twins of the user and the entities is input into a first MLA to project a course for the user and a respective course for each entity, and the projected courses are used by the first MLA to infer one or more events that involve the user in relation to one or more entities. Herein, a course may be a trajectory if the subject is in motion, an action in the physical or digital world, a continuation of a state, etc.

At S405, the method proceeds to identify at least one relevant inferred event from the one or more inferred events by inputting the inferred events to the first MLA. An inferred event is deemed relevant to the user if the event represents a risk or an opportunity for the user.

At S406, the at least one relevant inferred event that has been identified is communicated to the user, e.g. via the same user device or a different device associated with the user.

Once a potential risk or a potential opportunity is identified, it may be useful or desirable to recommend a response to the user that is appropriate for the relevant inferred event, especially for situations in which failure to respond to the event promptly or correctly can have serious consequences. In some embodiments, the method may further comprise: determining at least one appropriate response specific to the user based on the first set of data by inputting into the first MLA the at least one relevant inferred event; and interacting with the user through the user device to assist the user in performing the at least one appropriate response; or causing the user device to perform the at least one appropriate response autonomously. By interacting with the user through the user device to assist the user in performing an appropriate response, it is possible to interactively guide the user to appropriately respond to the potential risk or opportunity promptly. By causing the user device to perform the appropriate response autonomously, it is further possible to appropriately respond to the potential opportunity, and especially potential risk, promptly without user intervention. This is particularly important for situations in which, for example, the user may be incapacitated or otherwise unable to act or unable to act quickly, for example to avoid a collision or to raise an alarm for medical emergency, in which case present embodiments may act autonomously to e.g. stop the vehicle or alert a third party.

In some embodiments, interacting with the user may comprise: alerting the user to a potential risk arising from the at least one relevant inferred event; alerting the user to a potential opportunity arising from the at least one relevant inferred event; displaying the at least one relevant inferred event as a still image or a series of moving images on the user device; advising the user to adjust speed and/or direction; advising the user to take an alternative route; advising the user to interact with or avoid a specific entity from the one or more entities; or a combination thereof.

In some embodiments, causing the user device to perform the at least one appropriate response autonomously may comprise alerting a third party through the user device, adjusting the speed and/or direction of an autonomous vehicle through the user device.

In some situations, a potential risk may not only be an event that causes physical harm to a person or physical damages to an object, it may include non-physical risks such as cyber attacks, scams and frauds, device or online account hacking, etc. A separate or the same MLA may be trained to detect signs of such non-physical risks. In some embodiments, the method may further comprise inputting the first set of data and/or the second set of data to a second MLA to detect an anomaly indicating a possible attack to the user device or a network to which the user device is connected.

In some embodiments, the method may further comprise continuous learning by the first MLA to identify the at least one relevant future event from the inferred one or more future events based on feedback from the user on the relevance of previously inferred future events. In doing so, the first MLA may be updated continuously to output and communicate inferred events that are specific to the preference of the user.

In some embodiments, the method may further comprise continuous learning by the first MLA to determine the at least one appropriate response based on feedback from the user on the appropriateness of previously determined appropriate responses. In doing so, the first MLA may be updated continuously to output responses to inferred events that are specific to the preference of the user.

According to embodiments of the present technology, data related to a user and data related to entities in the surroundings of the user are collected, and the collected data is used for constructing a digital model of the user's surroundings in which the user and the entities are represented by their respective "digital twins". Depending on the data collected on the user and the entities, a "digital twin" may simply represent a position of the user or an entity, or it may replicate other aspects of the user or the entity, such as motion, behavioural pattern, and other attributes such as size, age, etc. The digital model comprising the respective digital twins of the user and the entities is then used as input to a machine learning algorithm (MLA) to project respective courses of the user and the entities, and the MLA uses the projected courses to infer one or more events involving the user in relation to one or more of the entities. The MLA then identifies whether any of the inferred events are relevant to the user, for example, whether any of the inferred events represent a risk or an opportunity for the user, and communicates the identified event or events to the user. The MLA may use data previously gathered on the user or other users to identify whether an inferred event is relevant.

Through constructing a digital model representing the user's local area populated with the respective digital twins of the user and entities in the local area of the user, embodiments of the present technology are able to infer near-future events by simulating the respective courses of the user and the entities using their digital twins and identify events that are relevant to the user, such that the user may avoid potential risks and/or exploit potential opportunities. Compared to approaches that focus on identifying a specific risk (e.g. collision), embodiments of the present technology are able to take into account data from multiple sources related to multiple entities and as such are able to infer near-future events in relation to multiple entities that may be relevant to the user.

Figure 5:
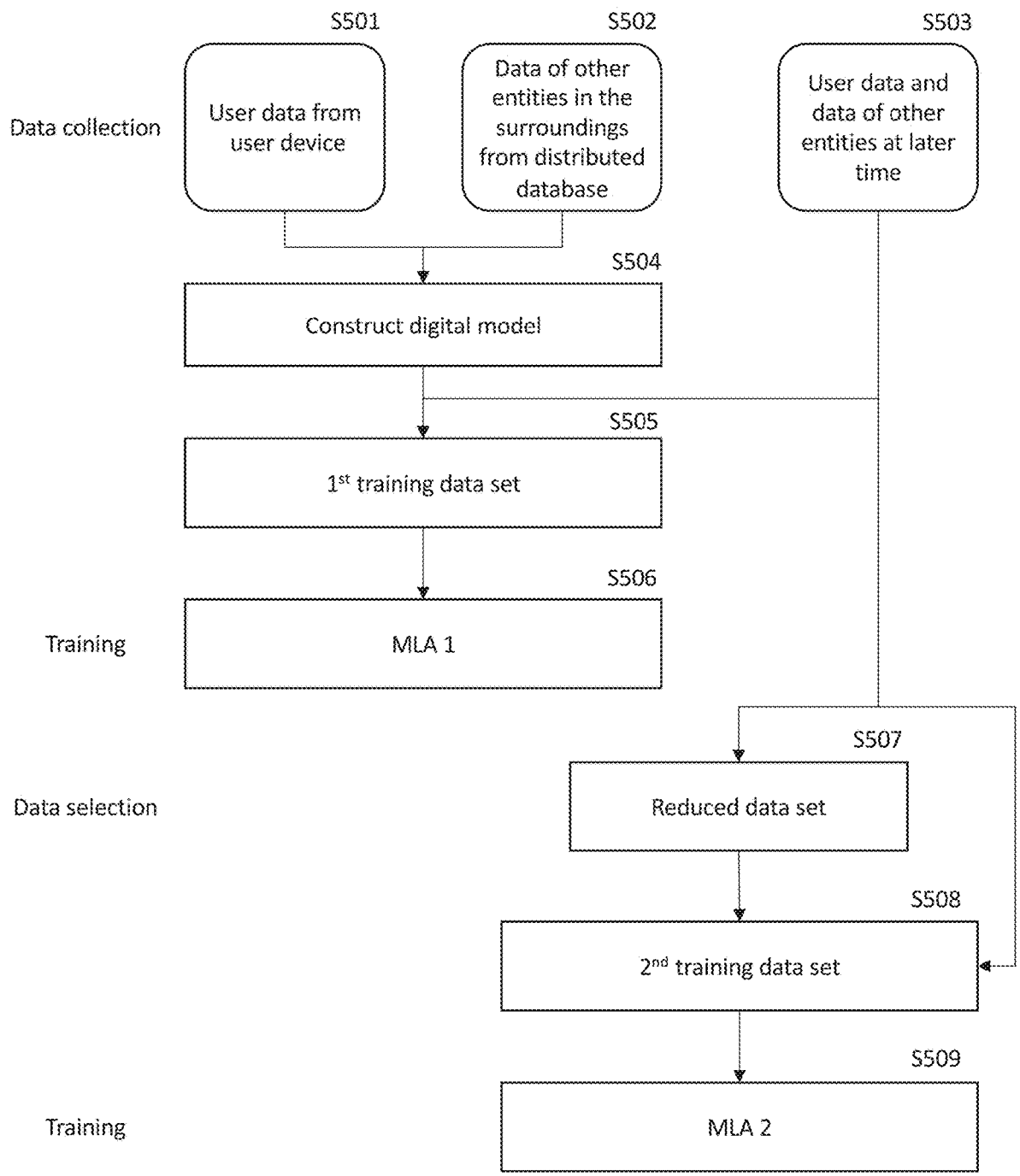
FIG. 5 shows a flow diagram of an embodiment of a method of training a machine learning algorithm for augmentation of human perception of the surroundings.

FIG. 5 shows a flow diagram of an embodiment of a method of training a machine learning algorithm for augmentation of human perception of the surroundings. In the following discussion, the method is described from the perspective of a user device for ease of illustration. However, it should be understood that the MLA is trained to process data received from multiple interconnected devices.

The method comprises the collection of training data. At S501, a first set of data is collected from a user device that is associated with a user. The first set of data includes information related to the user and comprises for example at least location information that represents the whereabout of the user device at a particular time.

In some embodiments, the first set of data may further comprise one or more of a velocity, movement, behaviour or behaviour patterns, or a category or classification of the user, and the second set of data may further comprise one or more of a velocity, movement, behaviour or behaviour patterns, or a category or classification of the one or more entities.

In some embodiments, the first set of data may further comprise one or more of: a planned route, one or more health records, one or more medical records, one or more contact lists, online activity history, and purchase history.

At S502, a second set of data is collected from a local distributed database (or multiple distributed databases if more than one are accessible) that is associated with the location information, which ensures a certain level of relevance of the second set of data to the user device. The second set of data comprises at least a position of one or more entities that are associated with the location information. In other words, the second set of data includes information about one or more entities that are in the same local area as the user device.

In some embodiments, the one or more entities may comprise: one or more humans, one or more animals, one or more vehicles including autonomous vehicles, one or more structures, one or more devices including publicly or privately owned computer, computer systems, drones and street cameras, and the second set of data may further comprise one or more public records, data collected on the one or more devices, data collected on the one or more vehicles, or a combination thereof.

A third set of data is also collected at S503 from the user and/or the user device, and the local distributed database. The third set of data represents information about one or more events that are associated with the location information (i.e. events that took place in the local area of the user device) which occurred over a predetermined time period from when the first and second set of data were collected. In other words, the third set of data comprises events that may involve the user and one or more entities in the local area that may have occurred as a consequence of their action.

At S504, a digital model is constructed which represents the user and the one or more entities as respective digital twins in a digital world using the first and second set of data.

In some embodiments, the method may further comprise: generating from the first set of data a respective motion vector for the user and generating from the second set of data a respective motion vector for the or each entity, the motion vector representing respective motion of the user and the entity, and the digital model may further comprise the respective motion vectors of the user and the one or more entities.

At S505, a first training data set is generated, which comprises the digital model and the third set of data.

At S506, the MLA is trained using the first training set. Using the digital model as input and the third set of data as output, the MLA is trained to project a course for the user and a respective for the one or more entities, which are used to infer one or more events that involve the user in relation to the one or more entities.

At S507, a reduced data set is produced from the third set of data by selecting at least one event from the third set of data that is deemed relevant to the user for identifying a risk or an opportunity for the user. The reduced data set may be generated by manual selection of specific events, or feedback by a human operator, etc. Then, at S508, a second training set is generated using the reduced data set.

In some embodiments, the second training set may be generated by selecting at least one event from the third set of data based on input/feedback on the relevance of a plurality of events with respect to a plurality of users.

At S509, the MLA is trained using the second training set to identify at least one relevant event from the one or more inferred events. For example, the MLA may use the third set of data as input and the reduced data set as output.

In some embodiments, the method may further comprise: generating a third training set by collecting data on responses performed by a plurality of users in response to a plurality of events; and training the MLA using the third training set to determine at least one appropriate response based on the at least one relevant inferred event.

In some embodiments, the method may further comprise: training the MLA using the third training set to identify whether to perform the at least one appropriate response autonomously or to interact with the user to enable the user to perform the at least one appropriate response.

In some embodiments, the method may further comprise: generating a fourth training set by collecting data on past attacks on one or more networks and one or more user devices; and training the MLA using the fourth training set to detect an anomaly indicating a possible attack based on the first set of data and the second set of data.

In summary, the present technology provides a computer-implemented method that comprises a training phase and a deployment phase of one or more MLA.

The training of the MLA comprises generating a first training set by collecting data from a first plurality of user devices comprising location information respectively associated with the first plurality of user devices, and data from a first plurality of distributed databases associated with the location information of the first plurality of user devices comprising information related to a first plurality of entities and a first plurality of events involving the first plurality of user devices and/or the first plurality of entities. Then, the MLA is trained using the first training set to infer one or more events specific to location information of a given user device.

Next, a second training set is generated by selecting, for each of the first plurality of user devices, at least one event from the first plurality of events that is relevant to a user associated with the user device based on behaviour data of the user. Then, the MLA is trained using the second training set to identify at least one relevant event from the one or more inferred events.

The trained MLA is deployed at e.g. a second user device by receiving a first set of data with respect to a second user from the second user device, the first set of data comprising at least location information of the second user device, and receiving a second set of data from a local distributed database associated with the location information of the second user device, the second set of data comprising information related to a second plurality of entities associated with the location information of the second user device.

Then, one or more future events involving the second user in relation to the second plurality of entities are inferred by inputting into the MLA the first set of data and the second set of data.

Next, at least one relevant future event is identified from the inferred one or more future events by inputting the one or more inferred future events into the MLA, and the at least one relevant future event thus identified is communicated to the second user.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The various MLAs described above may refer to the same or different MLA. If multiple MLAs are implemented, one or some or all of the MLAs may be executed on the device, and one or some or all of the MLAs may be executed on a server (e.g. a cloud server) in communication with the device via a suitable communication channel. It will be understood by those skilled in the art that the embodiments above may be implemented in any combinations, in parallel or as alternative strategies as desired.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

The invention claimed is:

1. A computer-implemented method of augmenting human perception of the surroundings to identify a risk and/or an opportunity, comprising:

receiving a first set of data with respect to a user from a user device associated with the user, the first set of data comprising at least location information and a planned route, the user device comprising a display;

receiving a second set of data from a local distributed database associated with the location information, the second set of data comprising a position of one or more entities associated with the location information;

generating from the first set of data a respective motion vector for the user and generating from the second set of data a respective motion vector for the one or more entities, the motion vectors representing respective motion of the user and the one or more entities;

constructing a digital model representing the user and the one or more entities using the first and second set of data, wherein the digital model comprises digital twins of the user and the one or more entities and the respective motion vectors of the user and the one or more entities, the digital twins replicating the positions, motions and behavioural patterns of the user and the one or more entities;

projecting a respective course for the user and for the or each entity by inputting the digital model into a first machine learning algorithm (MLA) to infer one or more events involving the user in relation to the one or more entities;

identifying at least one relevant inferred event from the one or more inferred events by inputting the one or more inferred events to the first MLA to identify a risk or an opportunity relevant to the user;

communicating the at least one relevant inferred event to the user;

determining at least one appropriate response specific to the user based on the first set of data by inputting into the first MLA the at least one relevant inferred event; and interacting with the user through the user device to assist the user in performing the at least one appropriate response, wherein interacting with the user comprises displaying the at least one relevant inferred event as a still image or a series of moving images on the user device and advising the user to take an alternative route.

2. The method of claim 1, wherein the first set of data further comprises one or more of a velocity, movement, behaviour or a category of the user, and the second set of data further comprises one or more of a velocity, movement, behaviour or a category of the one or more entities.

3. The method of claim 1, wherein interacting with the user further comprises: alerting the user to a potential risk arising from the at least one relevant inferred event; alerting the user to a potential opportunity arising from the at least one relevant inferred event; advising the user to adjust speed and/or direction; advising the user to interact with or avoid a specific entity from the one or more entities; or a combination thereof.

4. The method of claim 1, wherein causing the user device to perform the at least one appropriate response autonomously comprises alerting a third party through the user device, adjusting the speed and/or direction of an autonomous vehicle through the user device.

5. The method of claim 1, further comprising detecting a redundancy in the first and second set of data by cross-checking from a plurality of sources and removing the detected redundancy.

6. The method of claim 1, further comprising inputting the first set of data and/or the second set of data to a second MLA to detect an anomaly indicating a possible attack to the user device or a network to which the user device is connected.

7. The method of claim 1, wherein the one or more entities comprise one or more humans, one or more animals, one or more vehicles including autonomous vehicles, one or more structures, one or more devices including publicly or privately owned computer, computer systems, drones and street cameras, and wherein the second set of data further comprises one or more public records, data collected on the one or more devices, data collected on the one or more vehicles, or a combination thereof.

8. A non-transitory, computer readable storage medium storing instructions, which when executed by one or more computer processors, cause the one or more computer processors to implement a method of augmenting human perception of the surroundings to identify a risk and/or an opportunity, comprising the following steps:

receiving a first set of data with respect to a user from a user device associated with the user, the first set of data comprising at least location information and a planned route, the user device comprising a display;

receiving a second set of data from a local distributed database associated with the location information, the second set of data comprising a position of one or more entities associated with the location information;

generating from the first set of data a respective motion vector for the user and generating from the second set of data a respective motion vector for the one or more entities, the motion vectors representing respective motion of the user and the one or more entities;

constructing a digital model representing the user and the one or more entities using the first and second set of data, wherein the digital model comprises digital twins of the user and the one or more entities and the respective motion vectors of the user and the one or more entities, the digital twins replicating the positions, motions and behavioural patterns of the user and the one or more entities;

projecting a respective course for the user and for the or each entity by inputting the digital model into a first machine learning algorithm (MLA) to infer one or more events involving the user in relation to the one or more entities;

identifying at least one relevant inferred event from the one or more inferred events by inputting the one or more inferred events to the first MLA to identify a risk or an opportunity relevant to the user;

communicating the at least one relevant inferred event to the user;

determining at least one appropriate response specific to the user based on the first set of data by inputting into the first MLA the at least one relevant inferred event; and interacting with the user through the user device to assist the user in performing the at least one appropriate response, wherein interacting with the user comprises displaying the at least one relevant inferred event as a still image or a series of moving images on the user device and advising the user to take an alternative route.

* * * * *